United States Patent
Stocker et al.

[15] 3,666,793
[45] May 30, 1972

[54] PROCESS FOR THE PRODUCTION OF γ-CHLOROACETOACETIC ACID ESTERS

[72] Inventors: August Stocker; Karl-Josef Boosen, both of Visp, Switzerland

[73] Assignee: Lonza Ltd., Basel, Switzerland

[22] Filed: Apr. 22, 1969

[21] Appl. No.: 818,439

[30] Foreign Application Priority Data

Apr. 24, 1968 Switzerland ..................61006/68

[52] U.S. Cl. ....................260/479 S, 260/483, 260/544 Y
[51] Int. Cl. .........................................................C07c 67/00
[58] Field of Search...............................660/483, 479, 544 Y

[56] References Cited

UNITED STATES PATENTS 2,209,683  6/1940  Boese ....................................260/483

Primary Examiner—James A. Patten
Attorney—Christen & Sabol

[57] ABSTRACT

Esters of γ-chloroacetoacetic acid may be prepared by reacting diketene and chlorine in the presence of a low boiling organic solvent at temperatures of $-10°$ to $-30°$ C. and esterifying the reaction product while maintaining the aforementioned temperatures. This process produces yields up to 87 percent of theoretical with product purity of 97 to 98 percent.

13 Claims, No Drawings

PROCESS FOR THE PRODUCTION OF γ-CHLOROACETOACETIC ACID ESTERS

This invention relates to a process for the production of γ-chloroacetoacetic acid esters from diketene and chlorine, followed by esterification of the γ-chloroacetoacetic chloride initially formed with alcohols.

It is known that γ-chloroacetoacetic acid esters can be obtained by chlorinating diketene at temperatures of from 0° to 10° C. and esterifying γchloroacetoacetic chloride formed with alcohols. This reaction has advantage when conducted in the presence of inert solvents such as carbon tetrachloride, dichloroethane, dichloropropane or carbon disulphide. The resulting products are isolated from the reaction mixture by washing with water, drying and distilling off the solvent, followed by fractional distillation in vacuo. Crude yields of up to 73 percent can be obtained in the production of the ethyl ester, while crude yields of up to 87 percent can be obtained in the production of the phenyl ester. The phenyl ester obtained by this known process is a crude product, as may be deduced from the fact that no melting point is quoted for the solid and also from the fact that only a boiling point of from 134° to 136° C. at 8 mm Hg is quoted for the impure liquid crude product.

One object of the present invention is to provide an improved process for the production of γ-chloroacetoacetic acid ester. The improvement results in a greater yield and suppression of secondary reactions providing purer crude products. The crude product contains approximately 97 to 98 percent γ-chloroacetoacetic ester which, therefore, may be used without purification.

The improvement of the present invention is practiced by reacting diketene with chlorine in the presence of a low boiling solvent inert to chlorine, at temperatures from $-10°$ to $-30°$ C. and converting the γ-chloroacetoacetic chloride thus formed by reaction with alcohols into the corresponding γ-chloroacetoacetic acid esters at temperatures in the aforementioned range, whereby the alcohol employed in the second stage being introduced at a measured rate as it is consumed. The most favorable temperatures for the reaction are in a range from $-15°$ to $-25°$ C., the preferred temperature being $-20°$ C. Temperatures higher than $-10°$ C. promote secondary reactions, such as the formation of higher-chlorinated acetoacetic esters, while lower temperatures, i.e. temperatures below $-30°$ C., result in a great reduction in the rate of reaction.

Low boiling solvents which are suitable for practicing the present invention must be inert to chlorine and include chlorinated hydrocarbons such as dichloroethane, dichloropropane and carbon tetrachloride, as well as other inert solvents such as liquid sulphur dioxide which is preferred.

Liquid sulphur dioxide is preferred because on completion of the reaction, the solvent can be removed as a gas together with the HCl by-product using a water jet vacuum, and the product can be subjected to distillation if an extremely pure product is necessary.

The γ-chloroacetoacetic chloride initially formed by the reaction of diketene with chlorine at $-30°$ to $-10°$ C. is reacted with the alcohol without being separated from the solvent. The alcohol is introduced in measured quantities at such a rate that it is immediately consumed without ever being present in a large excess. It has proved to be particularly advantageous to introduce the alcohol, which optionally may be in a solution with the solvent, directly into the cooled reaction mixture and to ensure by further cooling that the temperature is maintained between $-30°$ and $-10°$ C. Alcohols suitable for practicing the present invention include aliphatic alcohols such as methanol, ethanol, propanol, isopropanol, butanol, and cyclohexanol or aromatic alcohols such as benzyl alcohol, phenol and cresol. It must be remembered that the anhydrous form of the alcohols should be used.

On completion of the reaction, the reaction mixtures are washed with water, dried for example with calcium chloride, magnesium sulphate and the like, and the solvents are distilled off. The desired γ-chloroacetoacetic acid esters are obtained as the residue in a purity of from 97 to 98 percent. There is no need to further purify them before they are used, for example in the production of dye stuffs, pharmaceutical products and the like. The yields vary from 87 to 97 percent.

Although as already described there is no need to further purify the crude product, extremely pure esters can be obtained by fractional distillation in vacuo. It must be remembered to keep the vacuum as low as possible. A vacuum of about 0.1 to 0.5 mm Hg is preferable in order to avoid decomposition. The following specific embodiments are presented to demonstrate the present invention.

EXAMPLE I

A mixture of 500 ml of $CCl_4$ and 84 g of diketene was cooled to $-20°$ C., and 71 g of chlorine gas was introduced at that temperature. 46 g of absolute ethanol were then added dropwise with the temperature maintained at $-20°$ C. Most of the HCl given off was removed in a water jet vacuum and the rest by repeated washing with water. The reaction mixture was dried with anhydrous magnesium sulphate and the solvent distilled off in vacuo. 150 g of γ-chloroacetoacetic acid ethyl ester were obtained as residue in a purity of 97 to 98 percent as determined by gas chromatography. The yield of ester was 88 percent of the theoretical, based on diketene.

EXAMPLE II 71 g of $Cl_2$ were introduced over a period of 1 hour at $-25°$ C. into a mixture of 84 g of diketene and 100 g of liquid $SO_2$ cooled to $-25°$ C. 46 g of absolute ethanol were then added dropwise at $-25°$ C. to $-15°$ C. The reaction mixture was then heated with stirring to room temperature and $SO_2$ and HCl were given off. Any residual gases were removed in a water jet vacuum. γ-chloroacetoacetic acid ethyl ester obtained represented a yield of 87 percent of the theoretical.

EXAMPLE III

The procedure of Example 1 was followed except that 1 mol of phenol dissolved in 100 ml of $CCl_4$ was used instead of ethanol. Removal of the solvent by distillation left a residue consisting of 97.9 percent of γ-chloroacetoacetic acid phenyl ester. The yield of ester represented 96.3 percent of the theoretical based on diketene.

Contrary to what had previously been observed the phenyl ester is a crystalline compound with a melting point of from 48° to 49° C.

The purity of the γ-chloroacetoacetic ester products following removal of the solvent is so high that it may be used as such an intermediate product in the production for example of azo dyes, pharmaceutical products based on pyrazolones, herbicides and plastics.

We claim:

1. A process for the production of esters of γ-chloroacetoacetic acid acid which comprises: (a) reacting diketene and chlorine to form γ-chloroacetoacetic acid chloride, said reaction being carried out at a temperature in the range of $-10°$ to $-30°$ C. in a reaction medium comprised of a solvent inert to chlorine; and (b) esterifying said γ-chloroacetoacetic acid chloride with an alcohol, said esterification being carried out at a temperature in the range of $-10°$ to $-30°$ C. in a reaction medium comprised of a solvent inert to chlorine, and said alcohol being introduced into the esterification step at a measured rate as it is consumed.

2. The process according to claim 1 wherein the reaction and esterification are conducted at a temperature of $-15°$ to $-25°$ C.

3. The process according to claim 1 wherein said solvent is selected from the group consisting of chlorinated hydrocarbons and liquid sulfur dioxide.

4. A process according to claim 1 wherein said alcohol is selected from the group consisting of methanol, ethanol, propanol, isopropanol, butanol, cyclohexanol, benzol, phenol and cresol.

5. The process according to claim 4 wherein said solvent is selected from the group consisting of dichloroethane, dichloropropane, carbon trichloride, carbon tetrachloride and liquid sulfur dioxide.

6. The process according to claim 5 wherein said solvent is liquid sulfur dioxide.

7. The process according to claim 6 wherein the reaction and esterification are conducted at a temperature of −15° to −20°C.

8. The process according to claim 7 wherein the solvent is liquid sulfur dioxide.

9. The process according to claim 1 wherein, after step (b), most of the HCl by-product is removed from the reaction mixture in a water jet vacuum.

10. The process according to claim 9 wherein substantially all of the remaining HCl by-product is then removed from the reaction mixture by repeated washings with water.

11. The process according to claim 9 wherein the water is then removed from the reaction mixture with anhydrous magnesium sulfate.

12. The process according to claim 9 wherein the reaction medium is then distilled off in vacuo.

13. The process according to claim 1 wherein, after step (b), the sulfur dioxide and the HCl by-product are removed by means of a water jet vacuum.

* * * * *